(12) United States Patent
Jin (10) Patent No.: US 8,730,880 B2
(45) Date of Patent: May 20, 2014

(54) APPARATUS AND METHOD FOR RESOURCE ALLOCATION IN MOBILE COMMUNICATION SYSTEM (75) Inventor: Gwui-Eon Jin, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 817 days.

(21) Appl. No.: 12/732,425

(22) Filed: Mar. 26, 2010

(65) Prior Publication Data

US 2010/0246495 A1    Sep. 30, 2010

(30) Foreign Application Priority Data

Mar. 26, 2009 (KR) .................. 10-2009-0025690

(51) Int. Cl.
*H04W 4/00* (2009.01)
(52) U.S. Cl.
USPC ......................................... 370/329

(58) Field of Classification Search
USPC ............................ 455/101, 456; 370/328, 329
See application file for complete search history.

(56) References Cited

U.S. PATENT DOCUMENTS

| | | | |
|---|---|---|---|
| 7,248,841 B2* | 7/2007 | Agee et al. ..................... 455/101 |
| 7,633,893 B2* | 12/2009 | Grindahl et al. .............. 370/315 |
| 2005/0197129 A1* | 9/2005 | Cho et al. ....................... 455/447 |
| 2005/0255849 A1* | 11/2005 | Kang et al. ..................... 455/446 |
| 2008/0032726 A1* | 2/2008 | Tajima et al. ................. 455/509 |
| 2008/0125154 A1* | 5/2008 | Zirwas et al. ................. 455/501 |
| 2010/0197314 A1* | 8/2010 | Maaref et al. ................. 455/450 |
| 2010/0322109 A1* | 12/2010 | Ahn et al. ...................... 370/254 |
| 2011/0065448 A1* | 3/2011 | Song et al. ................. 455/452.2 |
| 2011/0076954 A1* | 3/2011 | Wee et al. ..................... 455/63.1 |
| 2012/0196624 A1* | 8/2012 | Han et al. .................. 455/456.3 |

* cited by examiner

*Primary Examiner* — Asad Nawaz
*Assistant Examiner* — Syed S Ali
(74) *Attorney, Agent, or Firm* — Cha & Reiter, LLC (57) ABSTRACT An apparatus and method for providing a resource allocation of a Base Station (BS) in a mobile communication system includes, when a Mobile Station (MS) is located in a cell boundary region, locating a transmission frame region for the MS in a duty cycle reduction region.

6 Claims, 8 Drawing Sheets

FIG. 4A CONVENTIONAL CASE

FIG. 4B FFR PATTERN 1

FIG. 4C FFR PATTERN 2

APPARATUS AND METHOD FOR RESOURCE ALLOCATION IN MOBILE COMMUNICATION SYSTEM

CLAIM OF PRIORITY

This application claims the benefit under 35 U.S.C. §119(a) of a Korean patent application filed in the Korean Intellectual Property Office on Mar. 26, 2009 and assigned Serial No. 10-2009-0025690, the entire disclosure of which is hereby incorporated by reference.

BACKGROUND OF THE INVENTION

1. Field of the Invention

The present invention relates to an apparatus and method for improving transmission efficiency by reducing an influence of other-cell interference in such a manner that a frame region for duty cycle reduction in a conventional transmission frame region is partially allocated to a user by incorporating Zero Forcing (ZF) beamforming.

2. Description of the Related Art

A resource reuse scheme for dividing a system frequency band in a frequency domain or a time domain has conventionally been deployed to reduce inter-cell interference. In this scheme, resource allocation is achieved such that a resource used in each cell (or sector) is different from that used in its neighbor cell.

Figure 1A:
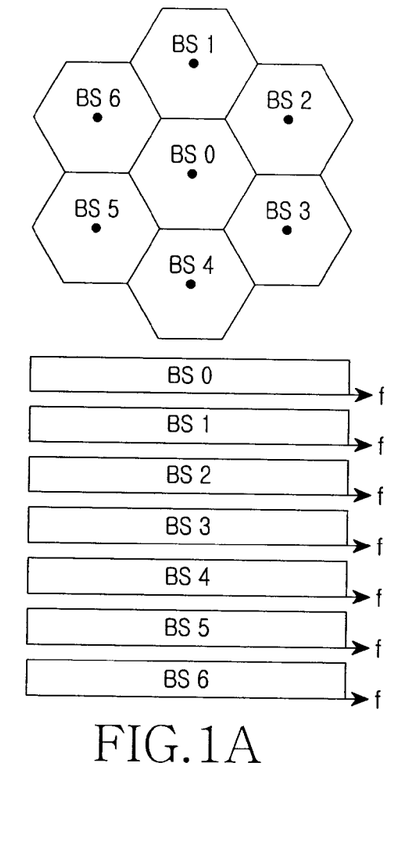
FIG. 1A illustrates a case where a conventional frequency reuse scheme is used when a reuse factor N is 1.

FIG. 1A illustrates a case where a conventional frequency reuse scheme is used when a reuse factor N is 1. As shown, a Base Station (BS) is located in a center of each cell where data transmission is achieved using the same frequency band.

Figure 1B:
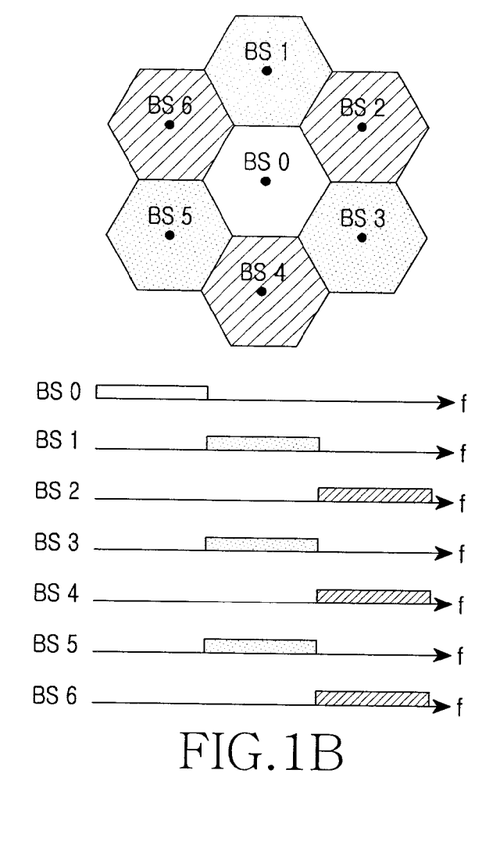
FIG. 1B illustrates a case where a conventional frequency reuse scheme is used when a reuse factor N is 3.

FIG. 1B illustrates a case where the conventional frequency reuse scheme is used when the reuse factor N is 3. As shown, a BS is located in a center of each cell. By dividing the system frequency band into 3 bands, all BSs can be prevented from using the same frequency resource used in neighbor cells, thereby reducing interference.

The frequency (or time) reuse scheme allows the neighbor cells to use different resources. Thus, there is an advantage in that inter-cell interference can be reduced.

However, an increase in the reuse factor N results in a decrease in a cell throughput which leads to a decrease in a performance gain. This is because a system frequency bandwidth is limited, and an increase in the frequency reuse factor N results in a decrease in an amount of frequency resources that can be used in each cell. Further, since a required transmission amount varies from one user to another, resources may be insufficient or wasted. Therefore, when the frequency reuse factor N is 1, the system operates in a most ideal manner in terms of overall system efficiency, and a highest cell transmission throughput can be determined. However, since all cells use the same frequency-band resource in this case, there is a problem in that reception performance significantly deteriorates when a user is located in a cell boundary.

SUMMARY OF THE INVENTION

An aspect of the present invention is to address at least the above-mentioned problems and/or disadvantages and to provide at least the advantages described below. Accordingly, an aspect of the present invention is to provide an apparatus and method for providing an improved resource allocation in a mobile communication system.

Another aspect of the present invention is to provide an apparatus and method for reducing inter-cell interference so as to be adaptive to a channel environment in such a manner that a conventional region having a frequency reuse factor N=1 in a conventional transmission frame region of a mobile communication system consisting of a single-antenna Base Station (BS) and a multi-antenna Mobile Station (MS) is allocated to an MS having a high Signal to Interference signal Ratio (SIR), and a region that can be used by employing a beamforming scheme and a frequency reuse scheme in an incorporative manner is partially allocated to an MS having a low SIR, such as an MS located in a cell boundary.

In accordance with an aspect of the present invention, a resource allocation method of a BS in a mobile communication system includes: when an MS is located in a cell boundary region, providing a transmission frame region for the MS in a duty cycle reduction region; when the MS is located in a cell center region providing the transmission frame region for the MS in a conventional region, completing a transmission frame, and transmitting the completed transmission frame.

In accordance with another aspect of the present invention, a BS apparatus for allocating a resource in a mobile communication system includes a controller for providing a transmission frame region for an MS in a duty cycle reduction region when the MS is located in a cell boundary region, and for providing the transmission frame region for the MS in a conventional region when the MS is located in a cell center region, and a modem for completing a transmission frame and for transmitting the completed transmission frame.

In accordance with another aspect of the present invention, a method of receiving a transmission frame of an MS in a mobile communication system includes, when a region of the MS belongs to a duty cycle reduction region in the received transmission frame, receiving the transmission frame by using Zero Forcing (ZF) beamforming.

In accordance with another aspect of the present invention, an MS apparatus for receiving a transmission frame in a mobile communication system includes a controller for receiving the transmission frame by using ZF beamforming when a region of the MS belongs to a duty cycle reduction region in the received transmission frame, and a modem for demodulating and decoding the received transmission frame.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

DETAILED DESCRIPTION OF THE INVENTION

Exemplary embodiments of the present invention will be described below with reference to the accompanying drawings. For the purposes of clarity and simplicity, well-known functions or constructions are not described in detail as they would obscure the invention in unnecessary detail.

Hereinafter, an apparatus and method for resource allocation in a mobile communication system will be described.

First, Zero-Forcing (ZF) beamforming will be described as follows.

As a scheme for cancelling inter-cell interference, the ZF beamforming cancels the inter-cell interference by configuring orthogonal signals between a Base Station (BS) from which a Mobile Station (MS) intends to receive a service and a BS which transmits an inter-cell interference signal.

When a mobile communication system consisting of K cells uses an MS having $M_R$ antennas, it is assumed that, during a feedback is made from the MS to a BS to use the ZF beamforming, a channel state does not change and channel information can be used.

An $M_R \times K$ channel matrix H formed between K BSs and the MS having $M_R$ antennas is expressed by Equation (1) below.

$$H = [h_1 h_2 \ldots h_K] \quad (1)$$

In Equation (1), $h_k$ is $[h_{1,(K)} h_{2,(K)} \ldots h_{M_R,(K)}]^T$ ($1 \le k \le K$), and k denotes a channel vector between a $k^{th}$ BS and the MS.

A signal y received by the MS is expressed by Equation (2) below.

$$y = Hx + n \quad (2)$$

In Equation (2), $x = [x_1 x_2 \ldots x_K]^T$ is a K×1 symbol vector transmitted by each of the K BSs, $n = [n_1 n_2 \ldots n_{M_R}]^T$ denotes an $M_R \times 1$ white noise vector of which an average is 0 and a variance is $\sigma^2$.

A beamforming matrix W for cancelling the inter-cell interference signal consists of vectors determined by normalizing respective columns of a matrix which is a pseudo-inverse matrix of the channel matrix H. That is, a $K \times M_R$ beamforming matrix $W = [w_1 w_2 w_K]$ consists of a row vector $w_1$ ($1 \le l \le K$), and is expressed by Equation (3) below.

$$W = \text{normalize}(\text{pseudo-inverse}(H)) \quad (3)$$

In this case, the MS using the ZF beamforming can demodulate a symbol transmitted by the $k^{th}$ BS as expressed by $y_{ZF,(k)}$ in Equation (4) below.

$$y_{ZF,(k)} = w_1 \cdot Hx + w_1 \cdot n, (w_1 \cdot h_k = 0 \text{ for } l \ne k). \quad (4)$$

Briefly, the mobile communication system of the present invention partially allocates a region for duty cycle reduction, during which a ZF beamforming reception scheme is used, in a conventional transmission frame region to a user so as to be adaptive to a channel environment, thereby reducing other-cell influence. Further, the present invention proposes a partial frequency reuse method for minimizing transmission efficiency deterioration while improving performance deterioration caused by other-cell interference in a multi-cell environment.

Figure 2:
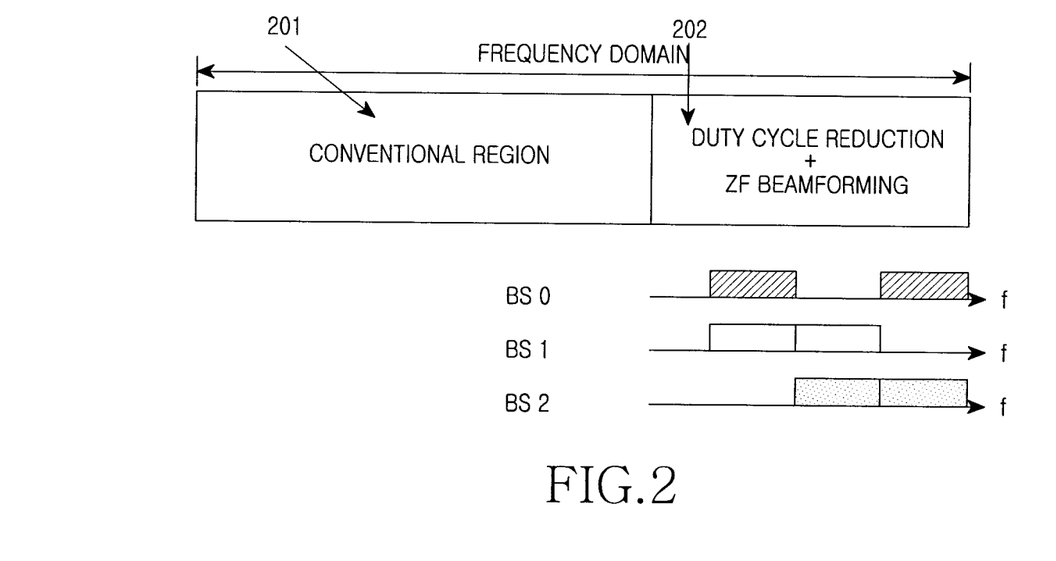
FIG. 2 illustrates a structure of a transmission frame according to an exemplary embodiment of the present invention.

FIG. 2 illustrates a structure of a transmission frame according to an exemplary embodiment of the present invention.

Referring to FIG. 2, a duty cycle reduction region 202 is additionally allocated in a conventional region 201 according to the teachings of the present invention in order to minimize the performance deterioration caused by inter-cell interference in a cell boundary. A function and feature of each region are as follows.

The conventional region 201 is a region in which all cells use the same resource with a reuse factor N=1 in a BS (or a transmitter) and managed in the same manner as in the conventional mobile communication system.

The duty cycle reduction region 202 is a region in which partial frequency reuse is applied between BSs so that the BSs use different frequencies to reduce an influence of interference acting on a user located in a cell boundary region. Here, a receiver uses a ZF beamforming reception scheme to improve transmission efficiency.

Figure 3:
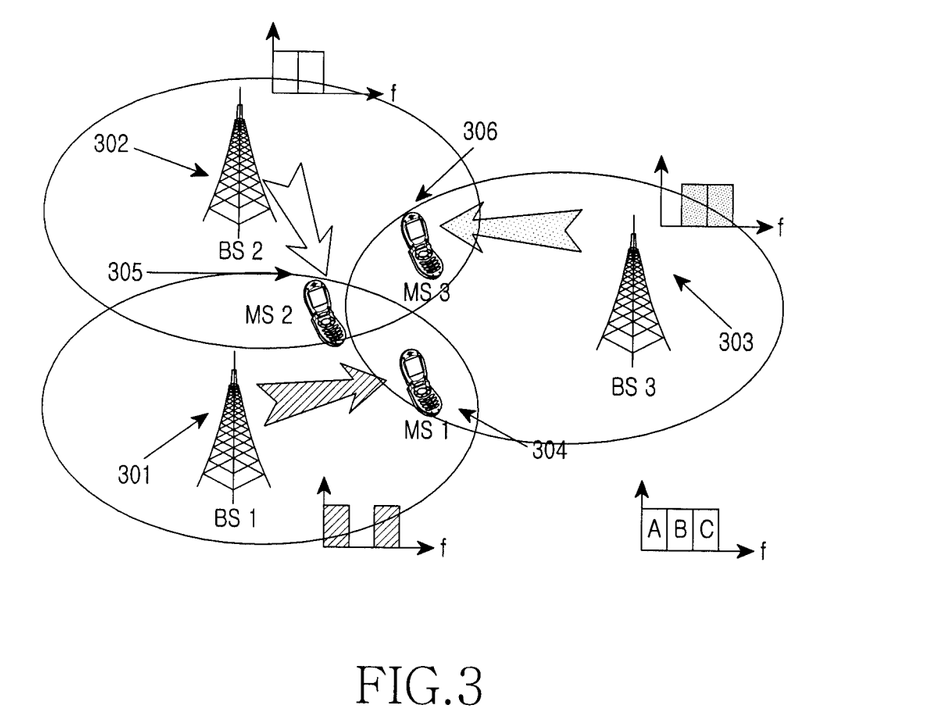
FIG. 3 illustrates a resource allocation method according to an exemplary embodiment of the present invention.

FIG. 3 illustrates a resource allocation method according to an exemplary embodiment of the present invention.

Referring to FIG. 3, MSs 304, 305, and 306 located in cell boundaries of BSs 301, 302, and 303 experience performance deterioration caused by inter-cell interference.

If the BSs 301, 302, and 303 use the same frequency resource, the MS1 304 located in a cell boundary experiences performance deterioration due to interference from the BS3 303 in all transmission frame regions A, B, and C.

In case of using the duty cycle reduction scheme and the ZF beamforming scheme of the present invention, that is, if the BSs 301, 302, and 303 allocate transmission frames of different frequency regions to the MS1 304, the MS2 305, and the MS3 306 as illustrated in FIG. 3, the MS1 304 receives a signal only from the BS1 301. When ZF beamforming is used to improve a Signal to Interference signal Ratio (SIR), the MSs 304, 305, and 306 can remove $M_R - 1$ inter-cell interference signals by using Equation (4) above according to the number $M_R$ of receive antennas.

Figure 4A:
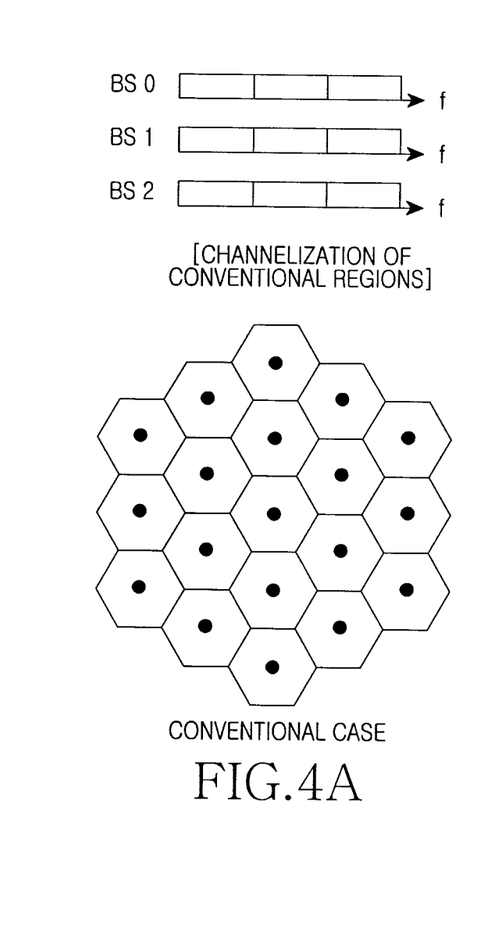
FIG. 4A illustrates a case where a frequency reuse factor is 1 according to an exemplary embodiment of the present invention.
Figure 4B:
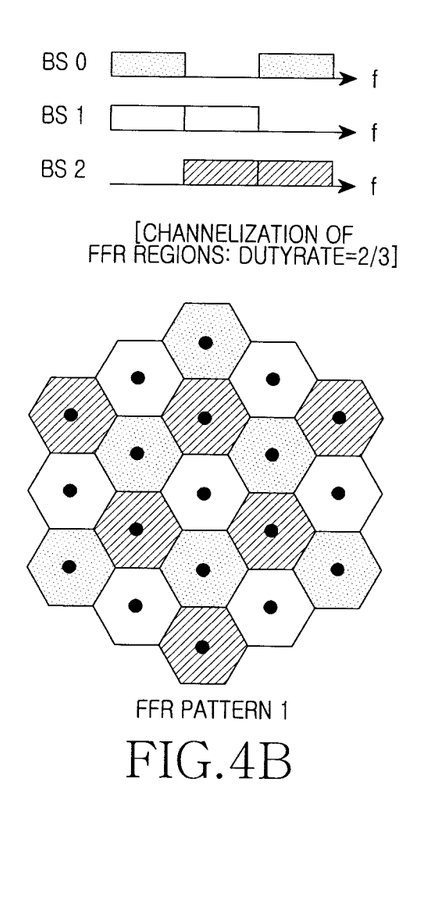
FIG. 4B illustrates a case where a frequency reuse factor is 3 according to an exemplary embodiment of the present invention.
Figure 4C:
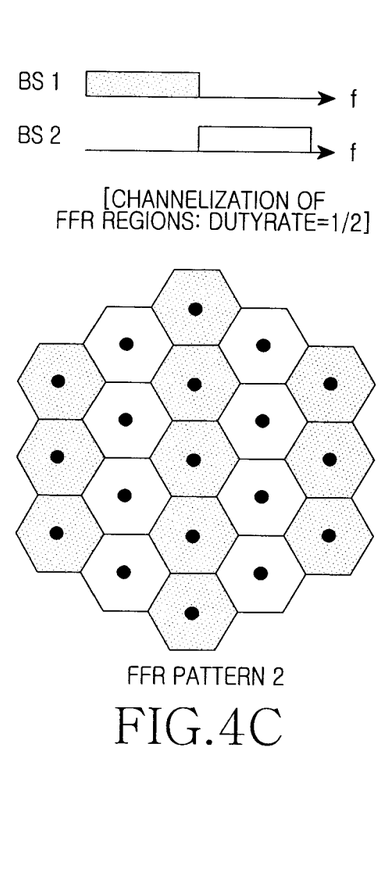
FIG. 4C illustrates a case where a frequency reuse factor is 2 according to an exemplary embodiment of the present invention.

For example, if a frequency reuse factor is 3 (see a Fractional Frequency Reuse (FFR) pattern 1 of FIG. 4B, an FFR pattern 2 of FIG. 4C is a case where the frequency reuse factor is 2), unlike in the conventional case (i.e., the frequency reuse factor is 1, see FIG. 4A), a BS for transmitting an interference signal to an MS differs according to a transmission frame region allocated to the MS.

Referring back to FIG. 3, if the MS1 304 is located in a position capable of receiving all signals of the BSs 301, 302, and 303.

If the MS1 304 is allocated to the transmission frame region A, the MS1 304 is influenced by an interference signal transmitted from the BS2 302. Further, if the MS1 304 is allocated to the transmission frame region C, the MS1 304 is influenced by an interference signal transmitted from the BS3 303.

In a case where the MS has two antennas and uses the aforementioned ZF beamforming scheme, the MS can receive a signal without inter-cell interference in the transmission frame regions A and C.

Accordingly, an influence of inter-cell interference can be minimized when each BS cooperatively uses the duty cycle reduction scheme while an MS uses the ZF beamforming reception scheme in an incorporative manner. As the number of receive antennas of the MS increases, the inter-cell interference can be further cancelled, and thus an additional performance gain can be determined.

Figure 5:
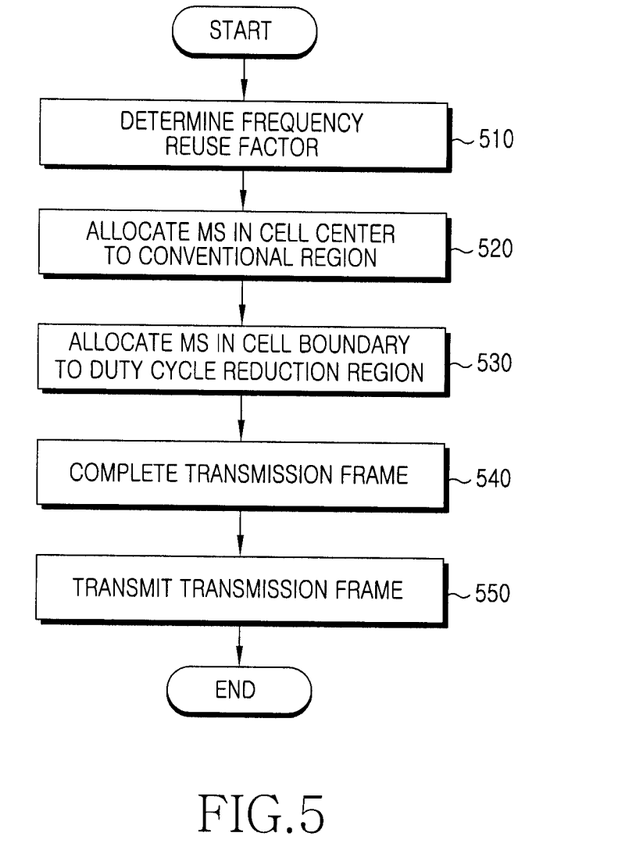
FIG. 5 is a flowchart illustrating an operation of a Base Station (BS) according to an exemplary embodiment of the present invention.

FIG. 5 is a flowchart illustrating an operation of a BS according to an exemplary embodiment of the present invention.

Referring to FIG. 5, before resource allocation of the BS, a frequency reuse factor is determined (step 510). The frequency reuse factor may be predetermined.

Thereafter, the BS allocates an MS located in a cell center to a conventional region of the aforementioned transmission frame (step 520), and allocates an MS located in a cell boundary to a duty cycle reduction region of the transmission frame (step 530). The BS can determine whether the MS is currently located in a cell center or a cell boundary on the basis of channel state information transmitted by the MS.

Thereafter, the BS completes a transmission frame to be transmitted (step 540), and then transmits the transmission frame (step 550).

Figure 6:
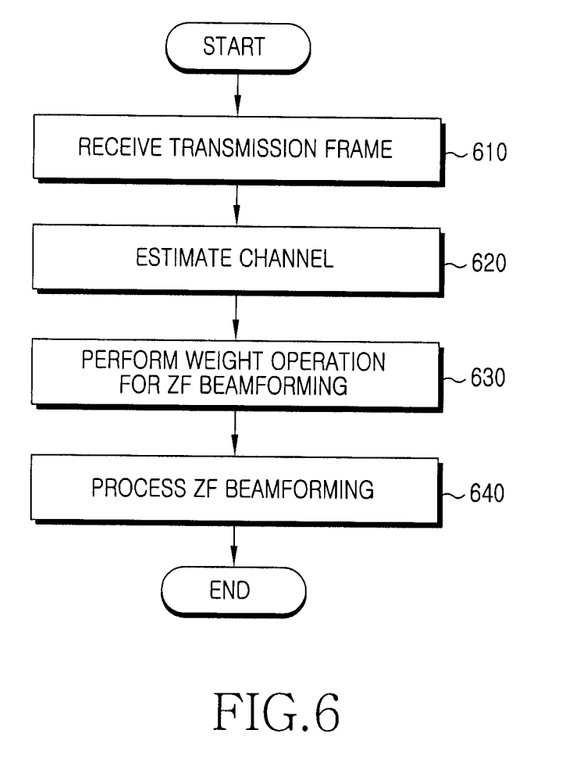
FIG. 6 is a flowchart illustrating an operation of a Mobile Station (MS) according to an exemplary embodiment of the present invention.

FIG. 6 is a flowchart illustrating an operation of an MS according to an exemplary embodiment of the present invention.

Referring to FIG. 6, the MS receives a frame transmitted by a BS (hereinafter, simply referred to as a transmission frame) (step 610).

Thereafter, the MS performs channel estimation on the transmitted transmission frame (step 620), and determines a weight by performing a weight operation for the ZF beamforming of the present invention (step 630). A weight matrix used in this operation corresponds to the aforementioned beamforming matrix.

Thereafter, the MS performs the ZF beamforming on the received transmission frame by using the weight (step 640), and performs a subsequent reception process.

If the transmission frame region allocated to the MS is a conventional region, the MS performs a conventional reception process, and if the allocated transmission frame region is a duty cycle reduction region, the MS performs the aforementioned ZF beamforming process.

Figure 7:
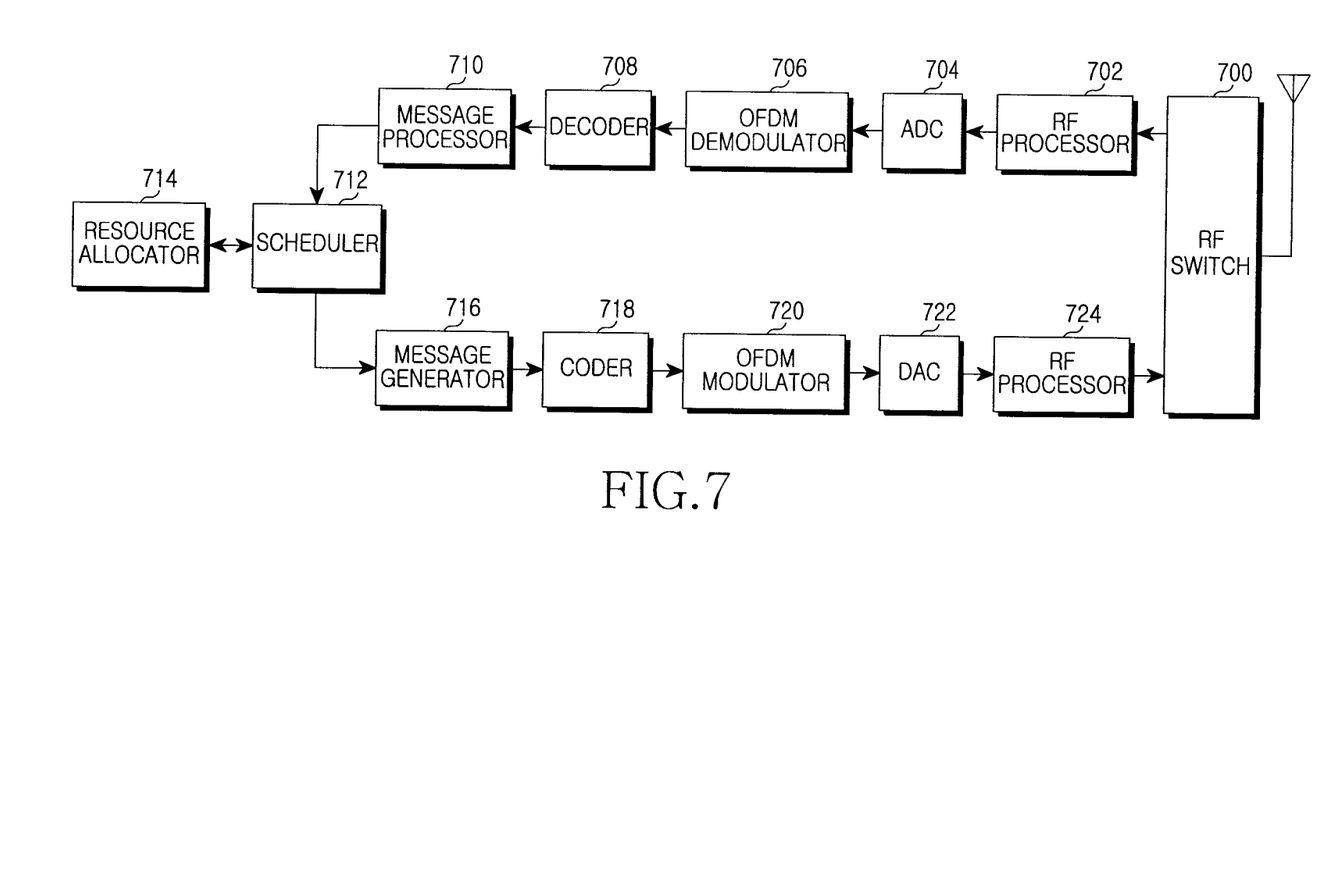
FIG. 7 is a block diagram illustrating a structure of a BS according to an exemplary embodiment of the present invention.

FIG. 7 is a block diagram illustrating a structure of a BS according to an exemplary embodiment of the present invention. For illustrative purposes, it is assumed herein that the wireless communication system uses a time division duplex scheme and an Orthogonal Frequency Division Multiplexing (OFDM) scheme. However, it should be noted that other transmission schemes can be implemented in accordance with the teachings of the present invention.

Referring to FIG. 7, the BS includes a Radio Frequency (RF) switch 700, an RF processor 702, an Analog/Digital Converter (ADC) 704, an OFDM demodulator 706, a decoder 708, a message processor 710, a scheduler 712, a resource allocator 714, a message generator 716, a coder 718, an OFDM modulator 720, a Digital/Analog Converter (DAC) 722, and an RF processor 724.

The RF switch 700 connects an antenna to the RF processor 702 of a receiver during a reception period according to a time-division duplex signal, and connects the antenna to the RF processor 724 of a transmitter during a transmission period. During the reception period, the RF processor 702 converts an RF signal provided from the RF switch 700 into a baseband analog signal.

The ADC 704 converts the analog signal provided from the RF processor 702 into digital sample data. The OFDM demodulator 706 converts the time-domain sample data provided from the ADC 704 into frequency-domain data by performing Fourier transform on the digital signal. In this case, the OFDM demodulator 706 performs the Fourier transform using a Fast Fourier Transform (FFT) operator.

The decoder 708 selects data of subcarriers to be actually received from the frequency-domain data provided from the OFDM demodulator 706. Thereafter, the decoder 708 demodulates and decodes the selected data according to a predetermined Modulation and Coding Scheme (MCS) level.

The message processor 710 decomposes a control message provided from the decoder 708 and provides the decomposition result to the scheduler 712.

The scheduler 712 provides the resource allocator 714 with the result provided from the message processor 710. Further, the scheduler 712 receives scheduling information provided from the resource allocator 714 and provides the scheduling information to the message generator 716.

The resource allocator 714 generates the scheduling information on the basis of the control message provided from the message processor 710. That is, on the basis of a result determined by analyzing the control message transmitted from an MS, the resource allocator 714 recognizes a location of the MS in a cell to determine whether the MS is located in a cell boundary or a cell center.

After recognizing the location of the MS, the resource allocator 714 determines a specific position of the MS in a transmission frame according to the location and provides information thereon to the message generator 716. The resource allocator 714 may determine whether the MS is currently located in the cell center or the cell boundary on the basis of channel state information transmitted by the MS.

During the transmission period, the message generator 716 allocates the MS to a region of the transmission frame according to the scheduling information (i.e., information on a position in the transmission frame) determined by the scheduler 712.

The coder 718 codes and modulates the message provided from the message generator 716 according to the MCS level.

The OFDM modulator 720 converts frequency-domain data provided from the coder 718 into time-domain sample data (i.e., an OFDM symbol) by performing inverse Fourier transform.

In this case, the OFDM modulator 720 performs the inverse Fourier transform by using an Inverse Fast Fourier Transform (IFFT) operator.

The DAC 722 converts the sample data provided from the OFDM modulator 720 into an analog signal. The RF processor 724 converts the analog signal provided from the DAC 722 into an RF signal of a specific channel.

In alternate embodiment, a controller (not shown) may perform functions of the constitutional elements 714, 712, 710, and 716. Accordingly, when the present invention is implemented as a product in practice, the functions of the constitutional elements 714, 712, 710, and 716 may be entirely or partially processed by the controller. Further, a modem chip may be used to perform functions of the constitutional elements 708, 706, 704, 718, 720, and 722.

Figure 8:
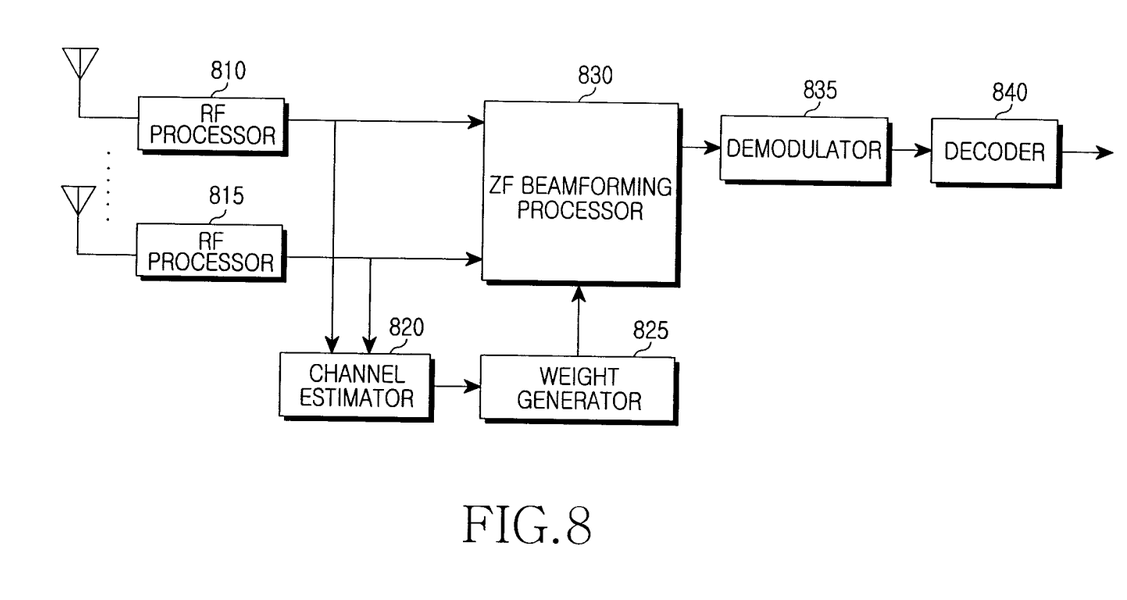
FIG. 8 is a block diagram illustrating a structure of an MS according to an exemplary embodiment of the present invention.

FIG. 8 is a block diagram illustrating a structure of an MS according to an exemplary embodiment of the present invention.

Referring to FIG. 8, the MS may be an multi-antenna MS, and it includes a plurality of antennas, a plurality of RF processors 810 and 815, a channel estimator 820, a weight generator 825, a ZF beamforming processor 830, a demodulator 835, and a decoder 840.

The RF processors 810 and 815 convert RF signals provided from the antennas into baseband signals. It is assumed that the RF processors 810 and 815 also perform an ADC conversion process.

The channel estimator 820 performs channel estimation on the signals processed with baseband processing by the RF processors 810 and 815 and provides a result of the channel estimation to the weight generator 825.

The weight generator 825 determines a weight for performing ZF beamforming on the basis of a channel estimation result value provided by the channel estimator 820, and provides the weight to the ZF beamforming processor 830. A weight matrix used in this operation corresponds to the aforementioned beamforming matrix.

The ZF beamforming processor 830 performs the aforementioned ZF beamforming process on the signal processed with the baseband processing on the basis of the weight provided by the weight generator 825, and provides a resultant signal to the demodulator 835.

The demodulator 835 demodulates the signal provided from the ZF beamforming processor 830, and provides the signal to the decoder 840 to perform a decoding process.

If a transmission frame region allocated to the MS is a conventional region, the MS performs a conventional reception process, and if the allocated transmission frame region is a duty cycle reduction region, the MS performs the aforementioned ZF beamforming process.

In an alternate embodiment, a controller (not shown) may perform functions of the constitutional elements 820, 825, and 830. Accordingly, when the present invention is implemented as a product in practice, the functions of the constitutional elements 820, 825, and 830 may be entirely or partially processed by the controller. Further, a modem chip may be used to perform functions of the constitutional elements 835 and 840.

According to exemplary embodiments of the present invention, a conventional region having a frequency reuse factor N=1 is allocated to an MS having a high SIR, and a region that can be used by employing a beamforming scheme and a frequency reuse scheme in an incorporative manner is partially allocated to an MS having a low SIR, such as an MS located in a cell boundary. As apparent from foregoing, this type of adaptive approach to a channel environment is advantageous in that other-cell interference can be reduced.

While the present invention has been shown and described with reference to certain exemplary embodiments thereof, it will be understood by those skilled in the art that various changes in form and details may be made therein without departing from the spirit and scope of the present invention as defined by the appended claims and their equivalents. Therefore, the scope of the invention is defined not by the detailed description of the invention but by the appended claims and their equivalents, and all differences within the scope will be construed as being included in the present invention.

What is claimed is:

1. A method for allocating resources by a Base Station (BS) configured for wireless communication in a cell, the method comprising:
   determining whether a mobile station is located in a cell center region or a cell boundary region;
   transmitting a plurality of transmission frames to the mobile station, each frame having at least one duty cycle reduction region allocated for when the mobile station is located in the cell boundary region and at least one conventional region allocated for when the mobile station is located in the cell center region, wherein zero force beamforming is performed during the at least one duty cycle reduction region during which a frequency reuse scheme is employed to remove inter-cell interference according to a number $M_R$ of receive antennas,
   wherein the at least one duty cycle reduction region is a region of which a frequency reuse factor is N, in which N stands for partial frequency reuse to reduce influence of interference acting on the mobile station in a cell boundary region; and
   wherein the at least one conventional region is a region of which a frequency reuse factor is 1.

2. A Base Station (BS) apparatus for allocating a resource in a mobile communication system, comprising:
   a controller for determining whether a mobile station is located in a cell center region or a cell boundary region and for providing in a duty cycle reduction region in a transmission frame when a mobile station is located in the cell boundary region, and for providing a conventional region in the transmission frame when the mobile station is located in the cell center region; and
   a modem for transmitting the transmission frame, wherein the mobile station performs zero force beamforming during the duty cycle reduction region during which a frequency reuse scheme is employed to remove inter-cell interference according to a number $M_R$ of receive antennas,
   wherein the duty cycle reduction region is a region of which a frequency reuse factor is N, in which N stands for partial frequency reuse to reduce influence of interference acting on the mobile station in a cell boundary region; and
   wherein the conventional region is a region of which a frequency reuse factor is 1.

3. A communication method for use in a Mobile Station (MS), the method comprising,
   receiving a transmission frame from a base station, the transmission frame having at least one duty cycle reduction region allocated for when the mobile station is located in a cell boundary region and at least one conventional region allocated for when the mobile station is located in a cell center region, and performing zero force beamforming during the at least one duty cycle reduction region during which a frequency reuse scheme is employed to remove inter-cell interference according to a number $M_R$ of receive antennas,
   wherein the base station determines whether the mobile station is located in the cell center region or the cell boundary region prior to a transmission of the transmission frame to the mobile station,
   wherein the at least one duty cycle reduction region is a region of which a frequency reuse factor is N in which N stands for partial frequency reuse to reduce influence of interference acting on the mobile station in a cell boundary region; and
   wherein the at least one conventional region is a region of which a frequency reuse factor is 1.

4. The method of claim 3, further comprising, when the region of the mobile station belongs to the at least one conventional region in the received transmission frame, receiving the transmission frame using a conventional reception process.

5. A Mobile Station (MS) for receiving a transmission frame in a mobile communication system, comprising:
   a plurality of antennas;
   a receiver coupled to the plurality of antennas to receive a plurality of transmission frames from a base station, each frame having at least one duty cycle reduction region allocated for when the MS is located in a cell boundary region and at least one conventional region allocated for when the mobile station is located in a cell center region, a controller for receiving the plurality of transmission frames by using Zero Forcing (ZF) beamforming during the at least one duty cycle reduction region to remove inter-cell interference according to a number $M_R$ of receive antennas; and a modem for demodulating and decoding the received transmission frame;

wherein the base station determines whether the mobile station is located in the cell center region or the cell boundary region prior to a transmission of the plurality of transmission frames, wherein the at least one duty cycle reduction region is a region of which a frequency reuse factor is N, in which N stands for partial frequency reuse to reduce influence of interference acting on the mobile station in a cell boundary region; and wherein the at least one conventional region is a region of which a frequency reuse factor is 1.

6. The apparatus of claim 5, wherein the controller receives the plurality of transmission frames by using a conventional reception process during the conventional region.

\* \* \* \* \*